Figure 1:
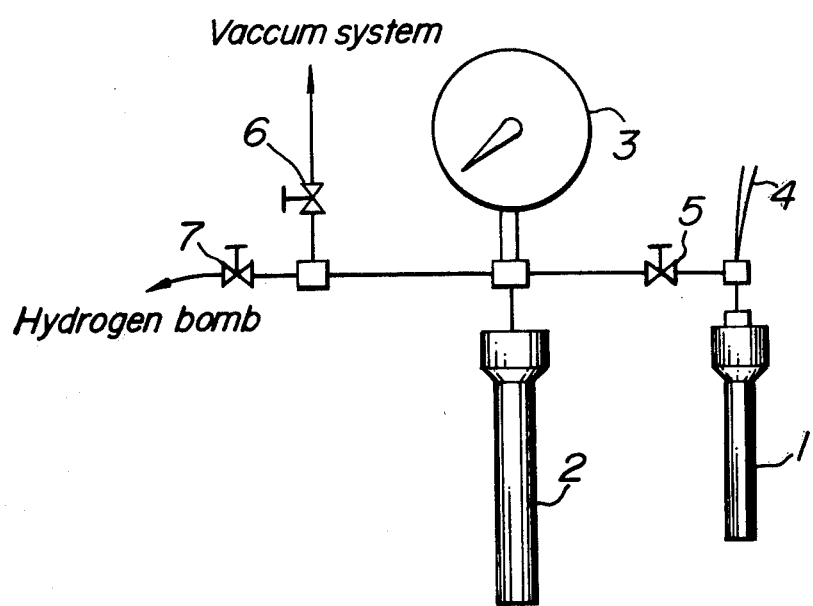

United States Patent [19]

Yajima et al.

[11] 4,126,242

[45] Nov. 21, 1978

[54] HYDROGEN-OCCLUDING ALLOY

[75] Inventors: Seishi Yajima; Hideo Kayano, both of Oharai; Hideo Toma, Kobe, all of Japan

[73] Assignee: The Research Institute for Iron, Steel and Other Metals of the Tohoku University, Japan

[21] Appl. No.: 774,034

[22] Filed: Mar. 3, 1977

Related U.S. Application Data

[63] Continuation of Ser. No. 594,047, Jul. 8, 1975, abandoned.

[30] Foreign Application Priority Data

Jul. 16, 1974 [JP] Japan .................................. 49-81342
May 19, 1975 [JP] Japan .................................. 50-58733

[51] Int. Cl.$^2$ .............................................. C22C 23/00
[52] U.S. Cl. ...................................... 220/83; 75/168 J
[58] Field of Search .................. 75/168 J, 152, 134 N; 220/83

[56] References Cited

U.S. PATENT DOCUMENTS

| | | | |
|---|---|---|---|
| 2,792,300 | 5/1957 | Livingston | 75/168 J |
| 3,801,311 | 4/1974 | Church et al. | 75/168 J |
| 3,912,103 | 10/1975 | Gerhard | 220/83 |

FOREIGN PATENT DOCUMENTS

| | | | |
|---|---|---|---|
| 53,452 | 5/1969 | Australia | 75/168 J |
| 938,189 | 12/1955 | Fed. Rep. of Germany | 75/168 J |
| 683,813 | 12/1952 | United Kingdom | 75/168 J |

OTHER PUBLICATIONS

Hansen, "Constitution of Binary Alloys", 2nd Ed., 1958, McGraw-Hill, pp. 455, 456, 884-886.
Yamamoto et al., "Partial Phase Diagrams of the Systems Mg-Th and Mg-Th-Zr", Trans ASM, 1957, pp. 4, 5, 8, 10-13, 15, 19.

*Primary Examiner*—Robert I. Smith
*Attorney, Agent, or Firm*—Hill, Gross, Simpson, Van Santen, Steadman, Chiara & Simpson

[57] ABSTRACT

A hydrogen-occluding alloy consisting of at least one element selected from rare-earth elements R and magnesium or of at least one element selected from rare-earth elements R, magnesium and nickel has a small density and is inexpensive and has an excellent hydrogen occlusion capacity as compared with the conventional La-Ni series alloys. The R-Mg series alloys and R-Ni-Mg series alloys are suitable as a material for hydrogen container.

4 Claims, 3 Drawing Figures

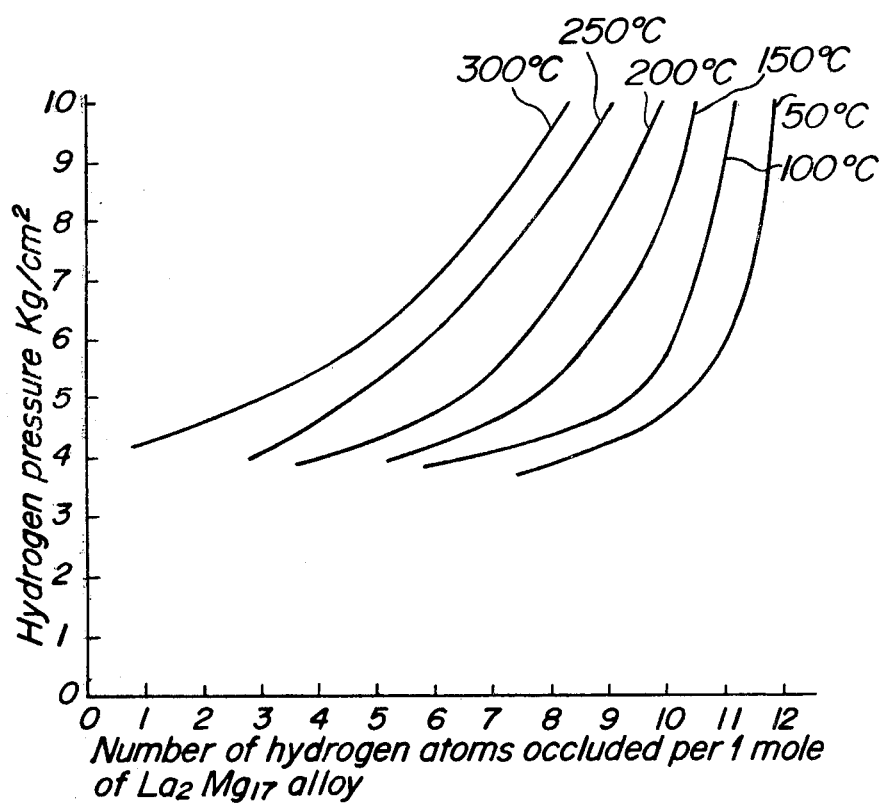

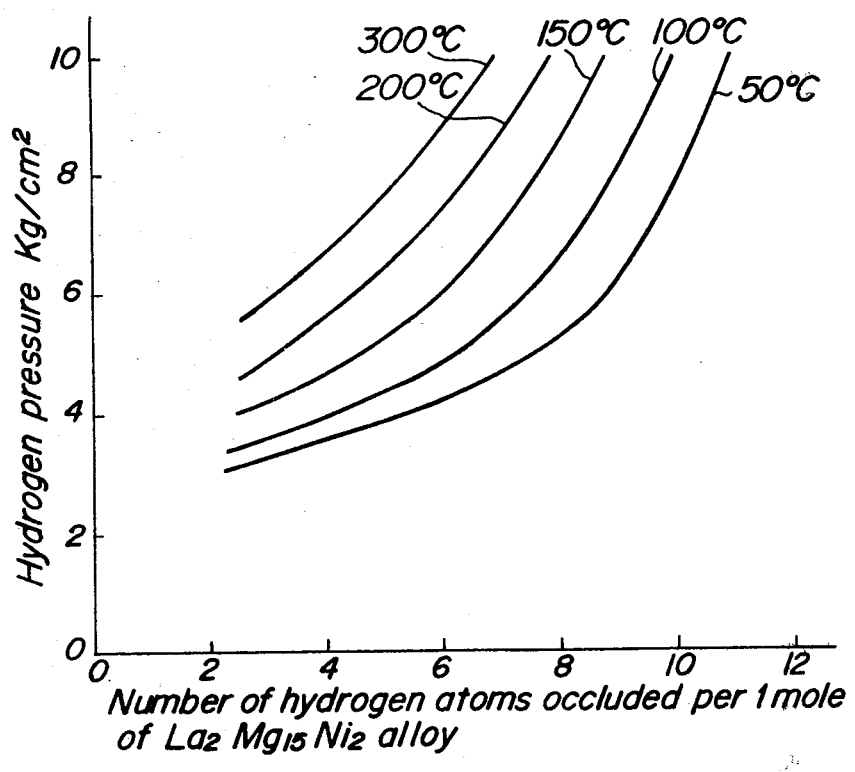
FIG_3

HYDROGEN-OCCLUDING ALLOY

This is a continuation, of application Ser. No. 594,047, filed July 8, 1975, now abandoned.

The present invention relates to a novel hydrogen-occluding alloy having an improved hydrogen occlusion capacity.

Hitherto, lanthanum-nickel series alloys, particularly $LaNi_5$ intermetallic compound have been known as a material for hydrogen container occluding a large amount of hydrogen. However, $LaNi_5$ alloy has a large density and is rather expensive. Furthermore, in order to occlude a given amount of hydrogen in such alloy, the weight of the alloy becomes larger and a higher hydrogen pressure is required.

Therefore, an object of the present invention is to solve the above described drawbacks of the prior art and to provide a novel alloy having an improved hydrogen occlusion capacity as a material for hydrogen container.

The inventors have found that intermetallic compounds of at least one element selected from rare-earth elements (hereinafter denoted by the general symbol R) and magnesium, i.e. alloys having a composition of $RMg$, $RMg_3$ or $R_2Mg_{17}$ are inexpensive and have a small density and an excellent hydrogen occlusion capacity. Especially, it has been found that $R_2Mg_{17}$ alloys have a hydrogen occlusion capacity of about two times higher than that of the conventional $LaNi_5$ alloy. Furthermore, it has been found that in these R-Mg series alloys, a hydrogen pressure required for occluding a given amount of hydrogen may be fairly lowered.

That is, a first aspect of the present invention lies in a hydrogen-occluding alloy consisting of 5.5 to 25 atomic % of at least one element selected from rare-earth elements and the remainder of magnesium.

In this description and in the claims the rare-earth element R is understood to include the elements having atomic numbers 57 to 71, i.e. lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tu), ytterbium (Yb) and lutetium (Lu), and the elements having properties similar to said elements, i.e. scandium (Sc) and yttrium (Y). These elements are always produced together in nature and as a typical ore, mention may be made of monazite, fergusonite, gadolinite, samarskite and the like.

According to the present invention, each simple element extracted and separated from the ore may be used alone or in admixture as the rare-earth element R, but in view of economical points, it is preferable to use a mixture of these simple elements. Among the above ores, the monazite is widely distributed in nature and is an economically important ore for rare-earth element. Therefore, a Misch metal obtained by electrolyzing chlorides of rare-earth elements extracted from the monazite is preferably used as the rare-earth element R in the present invention. Generally, the commercially available Misch metal contains 40-65 wt% of Ce, 20-35 wt% of La, 12-20 wt% of Nd, 5-10 wt% of Pr, 1-5 wt% of Sm and a small amount of impurities (Fe 0.1-1%, Mg 0.1-2%, Al 0.1-1%, Si 0.1-1%). Moreover, a metal containing about 70 wt% of La (i.e. didymium), which is obtained by removing Ce from the Misch metal, can also be used as the rare-earth element R in the present invention.

As mentioned above, there are three intermetallic compounds $RMg$, $RMg_3$ and $R_2Mg_{17}$ in the R-Mg series alloy according to the present invention. When the atomic ratio of R to Mg is 1:1, the resulting alloys show substantially the same hydrogen occlusion capacity because the rare-earth elements R are similar in the chemical and physical properties to each other. Particularly, the alloy having an atomic ratio of R to Mg of 2:17, i.e. $R_2Mg_{17}$ alloy consisting of 10.52 atomic % of R and 89.48 atomic % of Mg has a highest hydrogen occlusion capacity. Moreover, the hydrogen occlusion capacities of $RMg_3$ alloy and $RMg$ alloy are about ½ and about ¼ of that of $R_2Mg_{17}$ alloy, respectively.

The reason why the content of each component in the R-Mg series alloy is limited to the above range will be explained below.

When the content of at least one element selected from rare-earth elements R exceeds 25 atomic %, the hydrogen occlusion capacity per 1 mole of the resulting alloy is lower than that of the conventional $LaNi_5$ alloy. While, when the content is less than 5.5 atomic %, the hydrogen occlusion capacity is lower than that of $LaNi_5$ alloy. Therefore, the content of the rare-earth element R is necessary to be within the range of 5.5-25 atomic %. Particularly, the best result can be obtained when the content is 10.52 atomic %.

Similarly, when the content of magnesium is beyond the above range, the hydrogen occlusion capacity is lower than that of $LaNi_5$ alloy.

However, the R-Mg series alloy according to the present invention has a fairly small density as compared with the conventional $LaNi_5$ alloy, so that the volume required for occluding a given amount of hydrogen is increased considerably. As a result, a container for receiving such alloy is enlarged and its transportation becomes inconvenient.

Then, the inventors have made further investigations in order to solve such drawbacks and found that an alloy having a density smaller than that of $LaNi_5$ alloy but larger than that of the R-Mg series alloy can be obtained by adding a certain amount of nickel to said R-Mg series alloy without practically lowering the hyrogen occlusion capacity.

That is, a second aspect of the present invention lies in a hydrogen-occluding alloy consisting of 10.5–33.3 atomic % of at least one element selected from rare-earth elements, 4.5–87.5 atomic % of nickel and 2.5–84.5 atomic % of magnesium.

As the R-Ni-Mg series alloy according to the present invention, there are four intermetallic compounds $RMg_{2-x}Ni_x$, $RMg_{3-x}Ni_x$, $R_2Mg_{17-x}Ni_x$ and $RNi_{5-x}Mg_x$ (wherein $x$ is 1 to 16.5), which have a high hydrogen occlusion capacity, respectively. When the atomic ratio of R:Mg:Ni is 1:1:1, the resulting alloys show substantially the same hydrogen occlusion capacity because the rare-earth elements R are similar in the chemical and physical properties to each other as mentioned above. Particularly, it has been found that the alloy having a composition of $R_2Mg_{15}Ni_2$ has a highest hydrogen occlusion capacity.

The reason why the content of each component in the R-Mg-Ni series alloy is limited to the above range will be explained below.

When the content of the rare-earth element R is less than 10.5 atomic % or exceeds 33.3 atomic %, the hydrogen occlusion capacity per 1 mole of the resulting alloy is lower than that of the conventional $LaNi_5$ alloy.

When the content of nickel is less than 4.5 atomic %, the density becomes substantially equal to that of the R-Mg series alloy and the hydrogen occlusion capacity is lower than that of LaNi$_5$ alloy. While, when the content exceeds 87.5 atomic %, the density becomes substantially equal to that of LaNi$_5$ alloy and also the hydrogen occlusion capacity is lower than that of LaNi$_5$ alloy.

Furthermore, when the content of magnesium is less than 2.5 atomic % or exceeds 84.5 atomic %, the hydrogen occlusion capacity is lower than that of LaNi$_5$ alloy.

According to the invention, the intermetallic compounds RMg$_{2-x}$Ni$_x$ and RMg$_{3-x}$Ni$_x$, R$_2$Mg$_{17-x}$Ni$_x$ and RNi$_{5-x}$Mg$_x$ are formed by melting at least one element selected from rare-earth elements R with Mg and Ni, but it is very difficult to separate the resulting these intermetallic compounds into each individual compound.

However, there is no necessity for separating these intermetallic compounds into each individual compound, because not only the single intermetallic compound but also the alloy composed of the intermetallic compounds can be advantageously and economically used as a hydrogen-occluding alloy.

Moreover, the hydrogen occlusion capacity of the alloy composed of these intermetallic compounds lowers to about ½ of that of R$_2$Mg$_{15}$Ni$_2$ alloy. In case of the alloy containing more than 80% of R$_2$Mg$_{15}$Ni$_2$, however, the hydrogen occlusion capacity is approximately equal to that of R$_2$Mg$_{15}$Ni$_2$ alloy.

The invention will now be described in greater detail with reference to the accompanying drawings, wherein:

FIG. 1 is a diagrammatical view of an apparatus for measuring a hydrogen occlusion capacity of an alloy; and FIGS. 2 and 3 are graphs showing a relation between a hydrogen pressure and a number of hydrogen atoms occluded per 1 mole of La$_2$Mg$_{17}$ and La$_2$Mg$_{15}$Ni$_2$ alloys according to the invention at various temperatures, respectively.

The hydrogen occlusion capacity of the alloys according to the invention is measured by means of an apparatus shown in FIG. 1.

This apparatus comprises a microbomb 1 having a internal volume of 10 cc, a microbomb or container 2 having an internal volume of 30 cc, a Bourdon tube 3 for measurement of hydrogen pressure, a thermocouple 4 for measurement of temperature in the microbomb 1, cocks 5, 6 and 7, and stainless steel pipes having an outer diameter of 2 mm for connection of the cocks.

In the operation of the apparatus, an alloy having a particle size of 0.3–1 mm according to the invention is first charged into the microbomb 1 after a sleeve is removed from the top portion of the microbomb 1, and then the microbomb 1 is again sealed. The apparatus is evacuated by means of a vacuum system (not shown) by opening the cocks 5 and 6 and closing the cock 7. When a vacuum degree of $10^{-5}$ Torr is obtained, the microbomb 1 is heated to about 200° C. from exterior while maintaining said vacuum degree, whereby gases previously existing in the alloy is further discharged from the microbomb 1 to the vacuum system. Then, hydrogen gas is introduced into the microbomb 2 from a hydrogen bomb (not shown) by closing the cocks 5 and 6 and opening the cock 7. After the cock 7 is closed within a certain period of time, a hydrogen pressure $a$ in the apparatus is read by means of the Bourdon tube 3. Next, the cock 5 is opened and the microbomb 1 is rapidly cooled, whereby the hydrogen gas is occluded in the alloy of the microbomb 1 and the hydrogen pressure in the apparatus is lowered. After equilibrium is reached, a hydrogen pressure $b$ in the apparatus is again read by means of the Bourdon tube 3. Thus, the amount of hydrogen occluded in the alloy in a wall of the microbomb or container, can be determined from the difference between the hydrogen pressures $a$ and $b$.

Thus thus obtained alloy can be used as a hydrogen-occluding alloy for hydrogen container. In the use of this alloy, the hydrogen gas is rapidly discharged from the alloy only by heating the microbomb 1 after a valve provided on an outlet of the microbomb 1 is opened.

FIGS. 2 and 3 show the relation between the hydrogen pressure and the amount of hydrogen occluded in La$_2$Mg$_{17}$ and La$_2$Mg$_{15}$Ni$_2$ alloys according to the invention at various temperatures using the apparatus shown in FIG. 1, respectively.

As seen from FIGS. 2 and 3, the number of hydrogen atoms per 1 mole of La$_2$Mg$_{17}$ or La$_2$Mg$_{15}$Ni$_2$ alloy, i.e. the amount of hydrogen occluded in the alloy increases with the decrease of the temperature under the same hydrogen pressure. At the temperature of, for instance, 50° C., the higher the hydrogen pressure is, the larger the number of hydrogen atoms occluded, but such a number is substantially saturated at a hydrogen pressure of 9 Kg/cm$^2$, so that hydrogen pressure above 9 Kg/cm$^2$ is not significant.

Furthermore, it can be seen from FIGS. 2 and 3 that a gradient of hydrogen occlusion capacity between the hydrogen pressures 5 Kg/cm$^2$ and 10 Kg/cm$^2$ is considerably larger at 50° C. than at 300° C. This fact shows that when the hydrogen-occluding alloy according to the invention occludes a given amount of hydrogen, a lower temperature is preferable and the hydrogen pressure can be lowered. Therefore, when the alloy is practically used as a material for hydrogen container, the thickness of the container can be thinned and the discharge of the hydrogen gas occluded in the alloy is rapidly achieved by a relatively easy operation, i.e. by heating only the container.

The following examples are given in illustration of the invention and are not intended as limitations thereof.

EXAMPLE 1

A hydrogen occlusion capacity was measured with respect to various intermetallic compounds, i.e. hydrogen-occluding alloys shown in the following Table 1 by means of the apparatus shown in FIG. 1. The thus obtained results are also shown in Table 1.

Table 1

| Compound | Number of hydrogen atoms occluded per 1 mole of compound (50° C, hydrogen pressure: 10 Kg/cm$^2$) |
| --- | --- |
| LaNi$_5$ (Comparative) | 4 |
| La$_2$Mg$_{17}$ | 12 |
| Ce$_2$Mg$_{17}$ | 7 |
| Pr$_2$Mg$_{17}$ | 9 |
| Nd$_2$Mg$_{17}$ | 9 |
| M$^*$Mg$_{17}$ | 8 |
| [70% La]$^{**}$Mg$_{17}$ | 10 |
| La$_2$Mg$_{15}$Ni$_2$ | 10 |
| Ce$_2$Mg$_{15}$Ni$_2$ | 6 |
| Pr$_2$Mg$_{15}$Ni$_2$ | 8 |
| Nd$_2$Mg$_{15}$Ni$_2$ | 8 |
| M$^*$Mg$_{15}$Ni$_2$ | 7 |

Table 1-continued

| Compound | Number of hydrogen atoms occluded per 1 mole of compound (50° C, hydrogen pressure: 10 Kg/cm$^2$) |
|---|---|
| [70% La]$_2$**Mg$_{15}$Ni$_2$ | 8 |

Note)
*M is a Misch metal.
**[70% La] is a metal obtained by removing cerium (Ce) from the Misch metal.

As seen from Table 1, the alloy according to the invention has a hydrogen occlusion capacity considerably larger than that of the conventional LaNi$_5$ alloy.

EXAMPLE 2

A comparative experiment was made with respect to each of LaNi$_5$, La$_2$Mg$_{17}$ and La$_2$Mg$_{15}$Ni$_2$ alloys to obtain a result as shown in the following Table 2.

Table 2

| Alloy | Density (g/cm$^3$) | Number of hydrogen atoms occluded per 1 mole of alloy (50° C, hydrogen pressure: 10 kg/cm$^2$) | Weight required for occluding an amount of hydrogen corresponding to 50l of gasoline (Kg) | Volume required for occluding an amount of hydrogen corresponding to 50l of gasoline (cm$^3$) |
|---|---|---|---|---|
| LaNi$_5$ | 6 | 6 | 1,040 | 173 |
| La$_2$Mg$_{17}$ | 3 | 12 | 520 | 173 |
| La$_2$Mg$_{15}$Ni$_2$ | 4 | 10 | 624 | 156 |

As seen from Table 2, La$_2$Mg$_{17}$ and La$_2$Mg$_{15}$Ni$_2$ alloys according to the invention are smaller in the density and larger in the hydrogen occlusion capacity than the conventional LaNi$_5$ alloy. Therefore, when the alloy according to the invention is used as a material for hydrogen container, the weight required for occluding an amount of hydrogen corresponding to 50% of gasoline can be approximately reduced to half as compared with LaNi$_5$ alloy.

Furthermore, the density of La$_2$Mg$_{15}$Ni$_2$ alloy is slightly larger than that of La$_2$Mg$_{17}$ alloy, so that the volume required for occluding an amount of hydrogen corresponding to 50l of gasoline can be further reduced.

As mentioned above, the alloy according to the invention is small in the density and is inexpensive and has an excellent hydrogen occlusion capacity as compared with the conventional hydrogen-occluding alloy, so that it provides a considerably industrial merit.

What is claimed is:

1. In a container adapted for containing hydrogen therein having at least one wall for the retention of hydrogen, the improvement comprising said wall being made of an alloy having an improved hydrogen occlusion capacity, said alloy consisting of 5.5-25 atomic % of at least one element selected from rare-earth elements and the remainder of magnesium, said rare-earth elements being selected from the group consisting of lanthanum, cerium, praseodymium, neodymium, promethium, samarium, europium, cadolinium, terbium, dysprosium, holmium, erbium, thulium, ytterbium, lutetium, scandium and yttrium.

2. The container of claim 1 further characterized by the alloy having an atomic ratio of the rare-earth element to magnesium of 2:17.

3. In a container adapted for containing hydrogen therein having at least one wall for the retention of hydrogen, the improvement comprising said wall being made of an alloy having an improved hydrogen occlusion capacity, said alloy consisting of 10.5-33.3 atomic % of at least one element selected from rare-earth elements, 4.5-87.5 atomic % of nickel and 2.5-84.5 atomic % of magnesium.

4. The container of claim 3 further characterized by the alloy having an atomic ratio of the rare-earth element to nickel to magnesium of 2:2:15.

* * * * *